United States Patent
Arora et al.

(10) Patent No.: US 6,629,238 B1
(45) Date of Patent: Sep. 30, 2003

(54) PREDICATE CONTROLLED SOFTWARE PIPELINED LOOP PROCESSING WITH PREDICTION OF PREDICATE WRITING AND VALUE PREDICTION FOR USE IN SUBSEQUENT ITERATION

(75) Inventors: Judge K. Arora, Los Gatos, CA (US); Tse-Yu Yeh, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,462

(22) Filed: Dec. 29, 1999

(51) Int. Cl.[7] .................................................. G06F 9/38
(52) U.S. Cl. ........................ 712/241; 712/234; 712/239
(58) Field of Search ................................ 712/234, 235, 712/239, 241

(56) References Cited

U.S. PATENT DOCUMENTS

| | | | | |
|---|---|---|---|---|
| 4,435,756 A | * | 3/1984 | Potash ........................ 712/237 |
| 5,857,104 A | * | 1/1999 | Natarjan et al. ............. 717/158 |
| 5,903,750 A | * | 5/1999 | Yeh et al. .................... 712/236 |
| 6,304,960 B1 | * | 10/2001 | Yeh et al. .................... 712/236 |
| 6,367,004 B1 | * | 4/2002 | Grochowski et al. ........ 712/226 |

* cited by examiner

Primary Examiner—Kenneth S. Kim
(74) Attorney, Agent, or Firm—Dennis A. Nicholls

(57) ABSTRACT

The present invention provides a mechanism for predicting whether a predicate is written and a value of the predicate to be written. For one embodiment, a predicate predictor is used to predict whether a predicate, in some cases a stage predicate, is written and a value to be written for the predicate, using the branch type and branch prediction information supplied by a branch predictor. The predicted stage predicate value controls data hazard handling and data bypasses operations for intermediate stages of the processor's instruction execution pipeline. The predicted stage predicate value may be validated when the modulo-scheduled loop instruction is resolved at the back end of the instruction execution pipeline.

25 Claims, 9 Drawing Sheets

PREDICATE CONTROLLED SOFTWARE PIPELINED LOOP PROCESSING WITH PREDICTION OF PREDICATE WRITING AND VALUE PREDICTION FOR USE IN SUBSEQUENT ITERATION

BACKGROUND OF THE INVENTION

1. Field of the Invention

The present invention relates to the field of computer systems, and in particular, to systems and methods for processing predicated instructions.

2. Background Art

Advanced processors employ pipelining techniques to execute instructions at very high rates. A pipelined processor is organized into multiple stages of hardware, each of which performs one of the operations necessary to implement an instruction. Typically, each stage performs its operation in a single cycle of the processor's clock, and the instruction is completed step-wise, as it moves from stage to stage down the processor pipeline. Fetching a new instruction into the pipeline on each clock cycle keeps the pipeline full and allows the processor to complete an instruction on each clock cycle. Superscalar processors have multiple execution pipelines that allow multiple instructions to complete on each clock cycle.

An exemplary processor pipeline includes a front-end that prepares an instruction for execution and a back-end that completes execution of the instruction. The front-end fetches and decodes the instruction(s) in successive pipe stages. The back-end maps the instruction(s) to the processor's physical registers, retrieves operands from these registers, processes the operands according to the instruction (s), checks for execution problems (exceptions), and updates the processor's state with instruction results, in successive pipe stages.

Frequently, the execution resources available in pipelined, superscalar processors are not fully utilized because of the limited availability of instructions that may be executed parallel. For example, dependencies between instructions limit the instruction level parallelism (ILP) available in computer code. An instruction that depends on data generated by another instruction can not be executed in parallel, i.e. simultaneously, with the other instruction. Much effort has been invested in identifying ways to expose and exploit ILP in computer code.

Software pipelining is one technique for exposing ILP in computer code that contains loops. A loop is sequence of instructions ("loop body") that is executed repeatedly ("iterated") until a termination condition is met. As long as the termination condition is not met, the processor branches back to the beginning of the loop body. If the termination condition is met, the processor exits the loop and proceeds with the instructions that follow it. A loop is typically controlled through a branch instruction, which returns the processor to the beginning of the loop body or directs it to subsequent instructions according to the termination condition.

A loop is software pipelined by organizing the instructions of the loop body into stages of one or more instructions each. These stages form a software pipeline analogous to the processor's instruction execution pipeline. The software pipeline has a pipeline depth equal to the number of stages (the "stage count" or "SC") of the loop body. The instructions for a given loop iteration enter the software pipeline stage by stage, on successive initiation intervals (II), and new loop iterations begin on successive initiation intervals until all iterations of the loop have been started. Each loop iteration is thus processed in stages though the software pipeline in much the same way that an instruction is processed in stages through the processor's instruction execution pipeline. When the software pipeline is full, stages from SC sequential loop iterations are in process concurrently, and loop iterations begin and complete on every initiation interval. Various methods for software pipelining loops are discussed, for example, in B. R. Rau, M. S. Schlansker, P. P. Tirumalai, *Code Generation Schema for Modulo Scheduled Loops* IEEE MICRO Conference 1992 (Portland, Oreg.).

During a prolog phase, successive stages of the software pipeline are filled by "activating" the corresponding instructions on successive clock cycles. In a kernel phase, the software pipeline is full, so that one iteration of the loop is begun and one iteration is completed on each clock cycle. In an epilog phase, the software pipeline is emptied as the last iteration of the loop completes.

One technique for implementing software pipelined loops uses predication to gate the different stages of the software pipeline on or off. Predication allows instructions to be executed conditionally, by associating a predicate with one or more instructions, e.g. a software pipeline stage. The instruction(s) move down the processor's execution pipeline while the logic state of so the predicate is evaluated. If the predicate is in a first logic state, the associated instruction(s) completes normally and updates the processor's state. If the predicate is in a second logic state, the associated instruction is treated as a Non-Operation (NOP), i.e. it is ignored. For software pipelined loops, a "stage predicate" gates the instructions of a stage on or off, according to the phase of the software-pipelined loop.

One complication created by software-pipelining loops is that predicate information may be required relatively early in a processor's execution pipeline to maintain an uninterrupted flow of instructions. For example, predicates may be used to determine whether an instruction hazard should be addressed or to route data to an instruction. Delaying these operations until the predicate is actually resolved in the back end of the processor pipeline can offset the advantages gained by software pipelining.

The present invention addresses these and other problems associated with handling predicated instructions.

SUMMARY OF THE INVENTION

The present invention provides mechanisms for predicting predicates and for managing operations associated with instructions gated by the predicates.

In accordance with the present invention, a predicate predictor maintains speculative loop status information. The predicate predictor uses the speculative loop status information and instruction information to predict when a predicate will be written by an associated instruction, and a value to be written for the predicate.

For one embodiment of the invention, the predicate is predicted to be written when a modulo-scheduled loop branch instruction is detected, and the value predicted for the predicate is determined from the speculative loop status information and branch prediction information, as necessary. The predicted predicate value controls hazard handling and data-routing operations that arise before the predicate is actually resolved. Results generated using the speculative information may be validated once the branch instruction is executed.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DESCRIPTION OF THE INVENTION

Figure 1A:
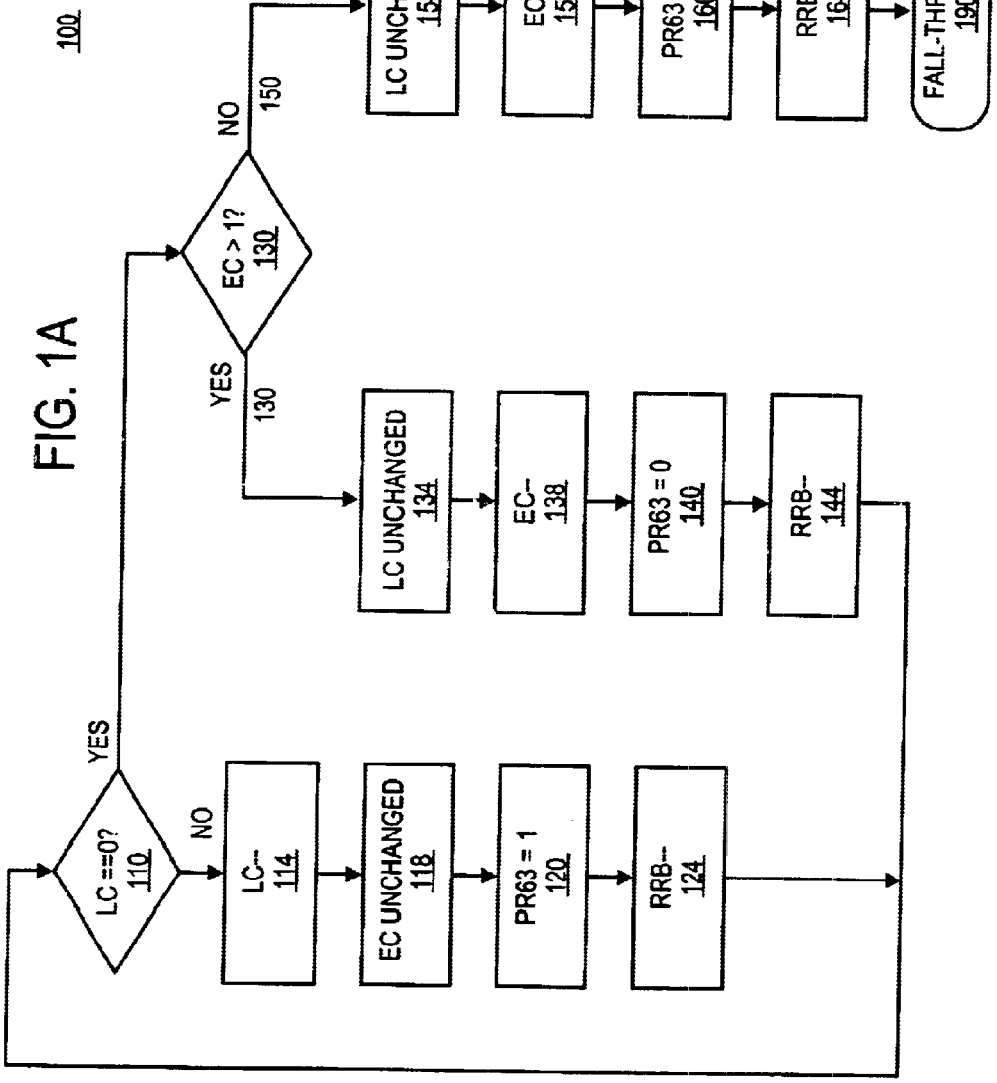
FIGS. 1A and 1B are flow charts representing the operations implemented by embodiments of counted and while loop-type branch instructions that are suitable for use with the present invention.

The following discussion sets forth numerous specific details to provide a thorough understanding of the invention. However, those of ordinary skill in the art, having the benefit of this disclosure, will appreciate that the invention may be practiced without these specific details. In addition, various well-known methods, procedures, components, and circuits have not been described in detail in order to focus attention on the features of the present invention.

The present invention provides a mechanism for generating a predicate prediction early in a processor's execution pipeline, using instruction and speculative state information. The mechanism provides predictions as to whether a predicate will be written and, where appropriate, a value for the predicate. The prediction is provided before an associated predicate-writing instruction is executed, and it may be used to implement or modify processes gated by the predicate. Results that depend on the predicted predicate may be validated at the back end of the processor pipeline, before the state of the processor is updated.

Depending on the particular implementation, the instruction information, e.g. branch type information, on which a prediction is based may itself be speculative. For example, an embodiment of the invention may employ a speculative branch type to determine whether or not a predicate is written. In the following discussion, references to instruction and/or branch type information include actual and speculative instruction and/or branch type information.

One embodiment of the invention provides a mechanism for handling implicit predicate writes that are associated with software-pipelined or modulo-scheduled loops. Whether a stage predicate is written for a given loop iteration and its value, if written, are predicted early in the instruction pipeline, using speculative loop status information and information on an associated loop branch instruction. A predicate predictor employs a branch type indication to predict whether the stage predicate will be written. The predicate predictor maintains speculative loop-status information, which it uses with the branch type indication and a branch prediction, if necessary, to predict a value for the stage predicate. Operations gated by the stage predicate may be activated or deactivated according to the predicted predicate value, until the actual predicate value becomes available. These operations include, for example, processing hazards raised by predicated instructions and adjusting operand bypass channels involving predicated instructions.

For another embodiment of the invention, the predicted stage predicate may be validated using branch information determined when the modulo-scheduled loop branch instruction is executed. Correctly predicted results are allowed to update the processor's architectural state. Incorrectly predicted results are handled by flushing the processor's pipeline and proceeding with the now-resolved loop branch instruction results.

To appreciate the present invention, it is useful to understand the operations associated with executing a modulo-scheduled loop branch instruction. FIG. 1A is a flow chart representing the operations associated with a modulo-scheduled, counted loop branch instruction. The operations represented in FIG. 1A correspond to those implemented by a CTOP branch in the IA-64 instruction set architecture (ISA) of Intel® Corporation. This ISA is described in greater detail in "IA-64 Application Instruction Set Architecture Guide", published by Intel® Corporation. Other ISAs that support software pipelining may provide comparable functionality through various combinations of instructions, hardware, and compiler support.

The illustrated ISA employs a loop counter (LC) and an epilog counter (EC) to track the status of a software pipelined counted loop. LC tracks the number of loop iterations that remain to be executed for a counted loop. The epilog phase of the loop is reached when LC reaches 0. For while-type loops, a branch predicate ("BR_PR") represents the loop termination condition. The value of BR_PR indicates whether the epilog phase has been reached. For both while and counted loops, EC tracks the number of active stages in the software pipelined loop.

The illustrated ISA also employs register rotation, which is a method for implementing register renaming in loops. In register rotation, the values stored in a specified set of registers are shifted cyclically among the registers. Rotation is typically done under control of a loop branch instruction, as illustrated below. For example, a value stored in a physical register, r(n), on a current iteration of a loop, is shifted to a physical register r(n+1) when the loop branch instruction is executed. The shift may be accomplished by incrementing a rotating register base (RRB) value. Register rotation is described, for example, in IA-64 Application Instruction Set Architecture Guide, published by Intel® Corporation of Santa Clara, Calif. A more detailed description may be found in Rau, B. R., Lee, M., Tirumalai, P., and Schlansker, M. S. *Register Allocation For Software Pipelined Loops,* Proceeding s of the SIGNPLAN '92 Conference on Programming Language Design and Implementation, (San Francisco, 1992).

For the disclosed branch, LC is tested 110 for each iteration of a loop, i.e. each time the loop-branch is executed. If LC>0, the loop is in its kernel or prolog phase. LC is decremented 114, a (software pipeline) stage predicate (SP)

is written 120, and RRB is decremented 124. Writing one to SP ensures that all active stages of the software pipeline remain active when the value of SP is rotated into a corresponding physical register during register renaming. The value of EC, which is typically initialized to the number of stages in the software pipelined loop, is preserved 118 through the kernel phase, as indicated.

When LC reaches zero 110, all iterations of the loop have been started and the epilog phase is reached. Branch 100 tests EC 130 to determine whether to enter the epilog phase (132) or fall-through (152) to the instructions that follow the loop. In the epilog phase (LC=0, EC>1), successive loop iterations drain the stages of the software pipeline. For the exemplary branch instruction, the software pipeline is drained by: decrementing EC 138 to update the loop status (another stage deactivated); writing a zero 140 to SP to deactivate the associated stage instructions; and decrementing RRB 144 to rotate the registers. The value of LC is preserved 134. The loop controlled by branch 100 is repeated with the updated values of EC, RRB, and SP until it is determined 130 that EC=1, i.e. the "fall-through" condition is reached.

When the "fall through" condition is detected (LC=0, EC=1), the loop status parameters are updated and control passes to the instructions following the loop. For the disclosed embodiment of branch 100, bookkeeping operations 154, 158, 160, 164 are performed and branch 100 "falls through" to the instruction(s) that follow the loop. Under certain conditions, the fall through condition occurs for LC=0, EC=0 (not shown), but the overall operation of the loop is similar.

Figure 1B:
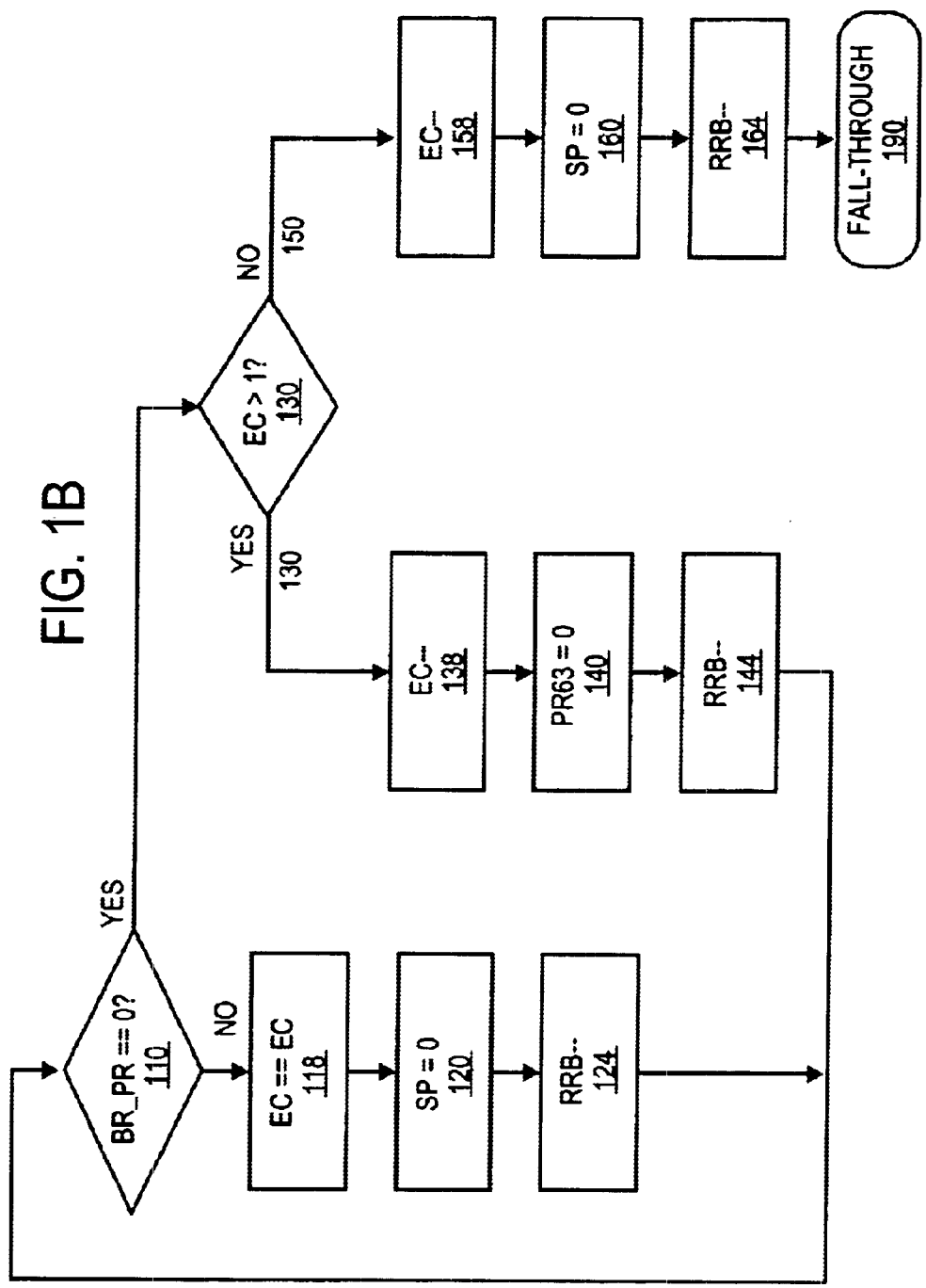

FIG. 1B is a flowchart representing the operations implemented by a modulo-scheduled while loop branch. One difference between the operations of FIG. 1A and FIG. 1B is the disclosed while-type loop branch writes a zero to SP. For this embodiment, the predicate written to by the while-type loop condition serves as the stage predicate. Other embodiments of while-type loop branch instructions may operate more similarly to the counted branch of FIG. 1A.

Figure 2:
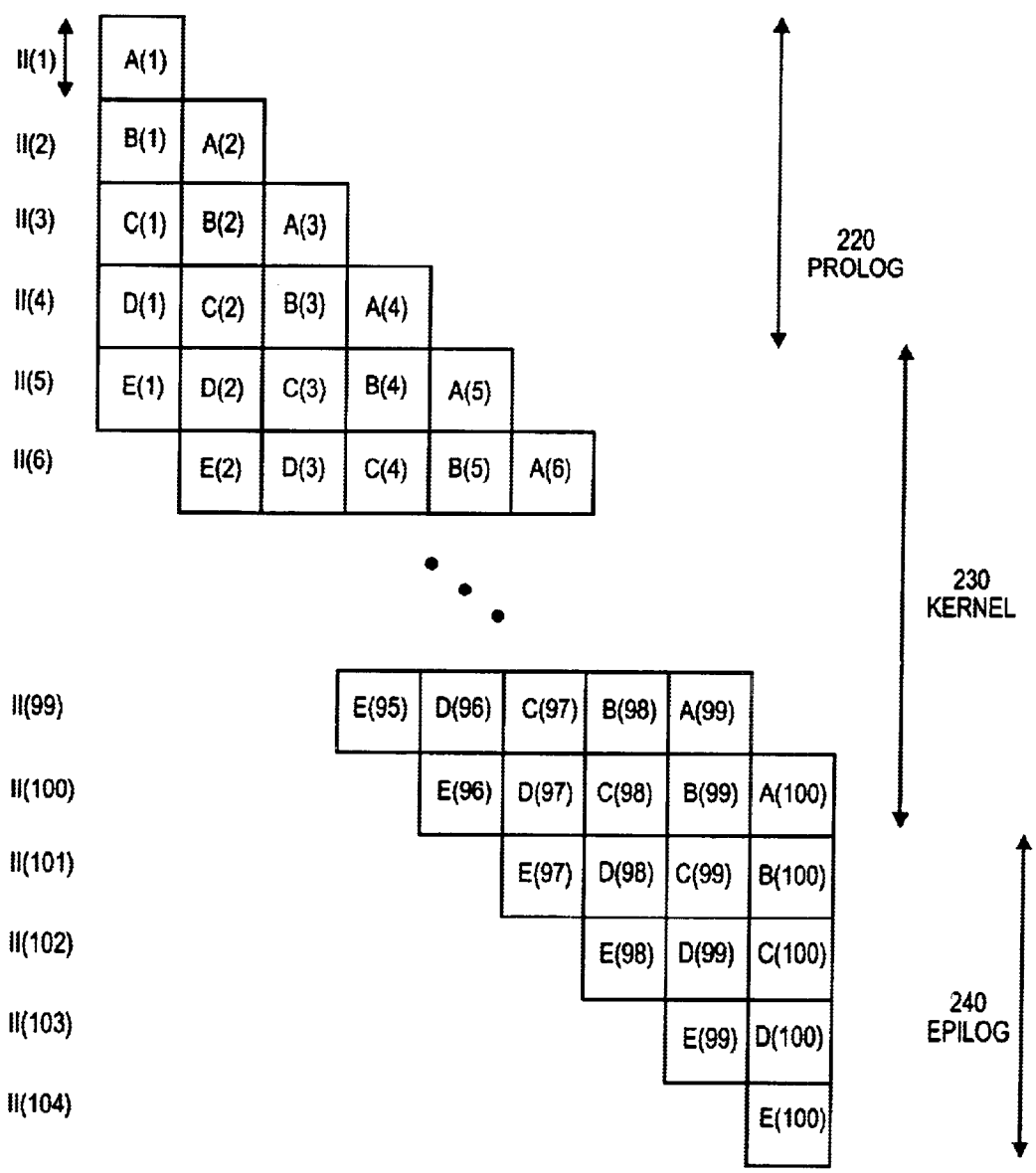
FIG. 2 is a block diagram of a software pipelined loop that may be generated using the loop branch instruction illustrated in FIG. 1A.

FIG. 2 is a schematic representation of a software pipeline 200 as it processes an exemplary loop through 100 iterations (trip count=100). The instructions of the loop are organized into five stages, labeled A through E (SC=5), and each stage is indexed by the logical iteration to which it corresponds. For example, A(1) is the first iteration of the loop body instruction(s) in stage A, and D(98) is the 98$^{th}$ iteration of the loop body instruction(s) in stage D. The software pipeline fills during a prolog phase 220, as stages from the first iterations of the loop begin on successive initiation intervals, II(1)–II(4). The software pipeline is full during a kernel phase 230 from II(5) through II(100), and it empties during an epilog phase 240, as the last four iterations complete during II(101)–II(104).

A stage of software pipeline 200 is activated by writing a one to SP and rotating this value into a corresponding physical (predicate) register. Repeating this write/rotate mechanism activates a new stage on each of the first 5 loop iterations, filling software pipeline 200. It also maintains the previously activated stages active, as new iterations of the stage instructions pass down the software pipeline. Software pipeline 200 is drained by writing a zeroes to SP and rotating this value into the predicate registers associated with successive stages. Software pipeline 200 is drained when zeroes have been written and rotated into the predicate registers associated with each of the loop stages.

Predication simplifies the scheduling issues associated with software pipelined loops. All stages of the software pipeline are present in each initiation interval, eliminating special prolog and epilog code. Only instructions in those stages that are activated by their associated stage predicates update the architectural state of the processor ("processor state") when they retire. Instruction in stages that are deactivated by their associated stage predicates are treated as no-operations (NOPs), and any results they generate do not update the processor state.

FIGS. 1A, 1B and 2 represent operations that occur as software pipelined instructions are executed. As noted above, these operations are implemented over the various stages of a processor's execution pipeline. For example, operations such as register rotation (RRB—), hazard handling, and data routing occur in stages that precede the actual execution stage of the processor's execution pipeline. That is, these operations occur before the branch instructions represented by FIGS. 1A and 1B are actually resolved and various side effects (RRB, LC, EC, SP updates) become part of the architectural processor state. The timing issues raised by pipeline execution may be better appreciated with reference to an exemplary instruction execution pipeline.

Figure 3:
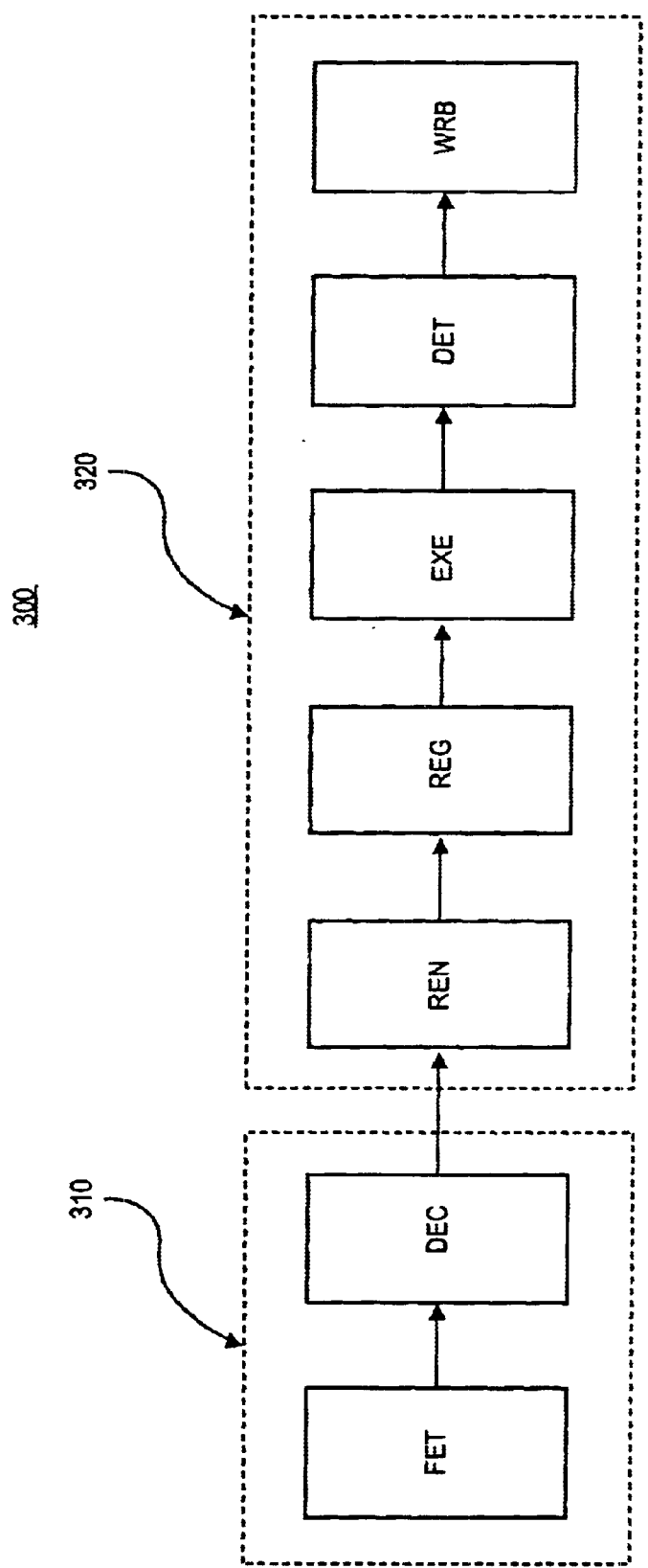
FIG. 3 is a block diagram of one embodiment of a processor pipeline suitable for implementing the present invention.

FIG. 3 is a block diagram of one embodiment of a processor pipeline 300 in which the present invention may be implemented. Pipeline 300 includes multiple instruction execution stages in which various operations are implemented to process an instruction. The present invention does not depend on the specific organization of pipeline 300. Different processors may divide the instruction processing operations into a greater or lesser number of pipe stages. In addition, some of pipe stages may require multiple clock cycles to traverse.

The disclosed embodiment of pipeline 300 includes a front end 310 and a back end 320. Front end 310 comprises a fetch stage (FET) and a decode stage (DEC) to identify and prepare instructions for execution. For one embodiment of pipeline 300, instructions identified for execution in FET stage are retrieved from an instruction cache and provided to DEC stage. In DEC stage, the instructions are decoded. For one embodiment of pipeline 300, instructions are provided by FET stage in bundles, and DEC stage maps the individual instructions of the bundle to their appropriate execution resources in back end 320.

When a branch instruction is detected, various branch prediction information may be determined in FET and DEC stages. Branch prediction information includes, for example, a predicted branch direction, i.e. whether the branch is taken (TK) or not taken (NT), and a branch target address (BTA). The BTA points to the instruction to be executed if the branch is TK. When the predicted branch direction is TK, the BTA is coupled back to FET stage, which retrieves the instruction(s) at the indicated address. As discussed below in greater detail, the predicted branch direction for a while-type branch provides a speculative value of a branch predicate (BR_PR).

Back end 320 comprises a rename stage (REN), a register stage (REG), an execute stage (EXE), a detection stage (DET), and a writeback stage (WRB) to complete execution of the instructions provided by front end 320. In REN stage, virtual register identifiers (IDs) specified in the instructions from DEC stage are mapped to physical registers on the processor. For the disclosed embodiment of the invention, a register rotation mechanism is implemented in REN stage for modulo-scheduled loop branch instructions. Since the branch is not actually resolved until the DET stage, one embodiment of the present invention adjusts RRB speculatively, using available branch and loop status information.

In the REG stage, register file(s) are accessed to retrieve operands for use in EXE, according to the corresponding instructions. In addition, hazards may be detected in REG stage. Hazards include, for example, determining whether the targeted register contains valid data or whether there is some other type of conflict that prevents access to the data.

In EXE stage(s), various execution units implement the decoded instructions, using data provided by the REG stage. EXE stage(s) may include, for example, one or more load/store units (LSU), integer execution units (IEU), floating point execution units (FPU), and branch execution units (BRU). Depending on the type of instructions they handle, the EXE stage(s) associated with different execution units may require different numbers of clock cycles to complete their operations. For simplicity, the execution latencies of the different execution units are not indicated in FIG. 3.

In DET stage, results generated by the various execution units are checked and if no problems are detected, the results are used to update the architectural processor state in the WRB stage. For the CTOP loop branch instruction of FIG. 1A, for example, architectural values for LC, EC, PS, and RRB are fully validated in WRB.

It is clear from pipeline 300 that the loop status data is not available until multiple pipeline stages after when it is needed to rotate registers (REN stage), assess the need to respond to hazards (REG stage), or route data (EXE stage).

Figure 4:
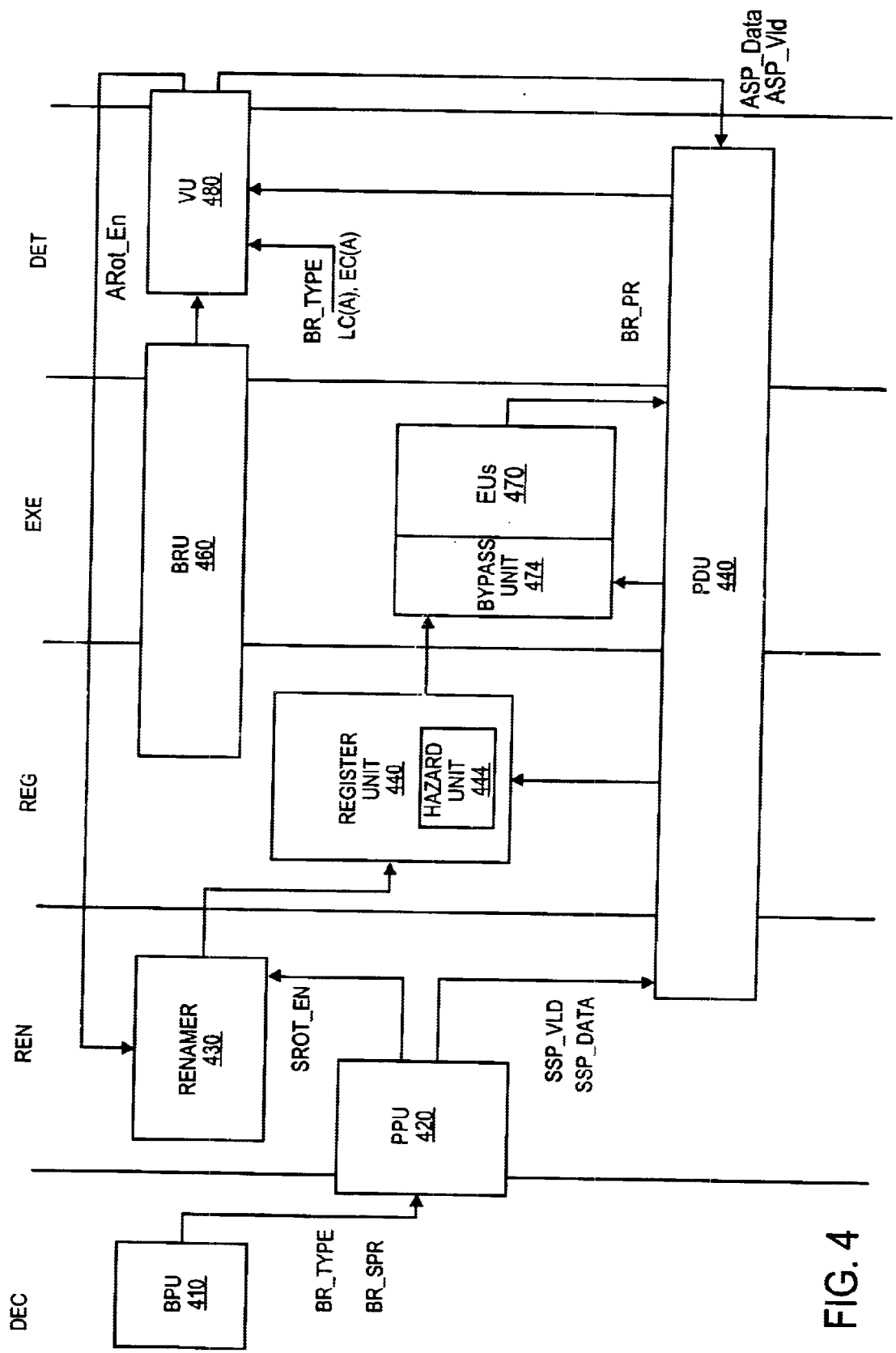
FIG. 4 is a block diagram of a predicate delivery system suitable for use with the pipeline of FIG. 3.

FIG. 4 illustrates one embodiment of a pipeline 400 that provides predicted predicate information prior to resolution of a corresponding predicate-writing instruction. Pipeline 400 indicates the points at which stage predicates may be predicted, compared with actual values, and corrected (if necessary). Pipeline 400 includes a branch prediction unit (BPU) 410, a predicated prediction unit (PPU) 420, a predicate delivery unit (PDU) 440, a renamer 430, a register unit 440, execution unit(s) 470, a branch execution unit (BRU) 460, and a validation unit (VU) 480.

EU 470 represents various execution units that are typically present in a processor, such as the FPUs, LSUs, and IEUs discussed above. BRU 460 is shown separately because of the role it plays in predicate handling. Also shown for EU 470 is a bypass unit 474. Bypass unit 474 includes circuitry to route data between different EUs and their support structures. It is used when data is provided to an EU from a source other than register unit 440. Register unit 440 includes a hazard unit 444, which determines whether data sought by a particular instruction is available. The present invention is particularly useful for adjusting the operation of hazard unit 444 and bypass unit 474 according to predicted predicate information.

For the disclosed embodiment, PPU 420 receives branch prediction information (TK, NT) and branch type information (BR_TYPE) from BPU 410. BR_TYPE may also be provided by decode logic in DEC stage. One embodiment of PPU 420 also receives initial values of LC and EC, which it updates speculatively to provide an indication of the current state of these variables at the back end of pipeline 400. Initial values of these loop status variables may be available through MOV_TO_EC or MOV_TO_LC, which are used to initialize LC and EC in BRU 460.

PPU 420 uses this input to generates signals that enable register rotation (SROT_EN), indicate a stage predicate is predicted to be written (SSP_VLD), and indicate a predicted value for the stage predicate (SSP_DATA) according to a scheme discussed in greater detail below. SROT_EN is provided to renamer 430 to update mappings between logical and physical registers. SSP_VLD and SSP_DATA are provided to PDU 450, which makes them available to various resources in REG and EXE stages. For example, hazard unit 444 may use the value of SSP_DATA for an instruction to determine whether a hazard raised by the instruction needs to be addressed. Bypass unit 474 may use SSP_DATA to account for the activated or deactivated state of an instruction in a bypass chain.

For another embodiment of the invention, hazard unit 444 includes a scoreboard, which indicates whether data in a targeted register(s) is valid. The data may be invalid if, for example, a load instruction that moves the data to the register(s) has not completed when the access occurs. For one embodiment of the present invention, hazard unit 444 checks the value of SSP_DATA before invoking a hazard handling routine. Hazard unit 444 ignores a hazard indication when the SSP_DATA is zero, e.g. when the instruction that triggers the hazard is nullified. This prevents instructions that are likely to be nullified from stalling pipeline 400.

Bypasses are typically implemented in an execution stage, e.g. EXE, when result operands generated by an executed instruction become available for transfer to dependent instructions. The compare instructions typically used to determine predicate values are also evaluated in EXE, which is too late to configure a bypass between an instruction in the same issue group and a dependent instruction. The present invention uses SSP_DATA to determine a suitable bypass configuration that comprehends the activated or deactivated state of instructions in the bypass chain.

Figure 5C:
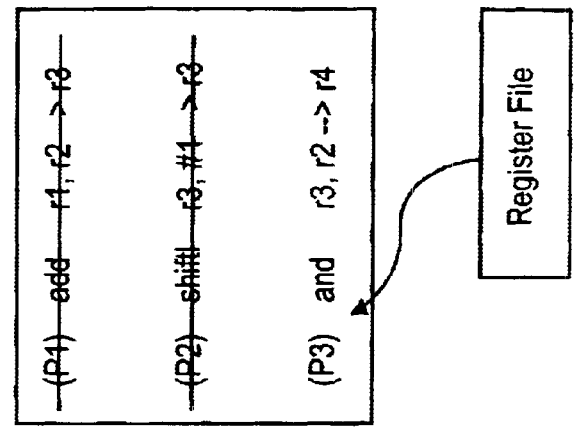
FIGS. 5A, 5B, and 5C represent various operand bypass scenarios that may be addressed using speculative predicate information.
Figure 5B:
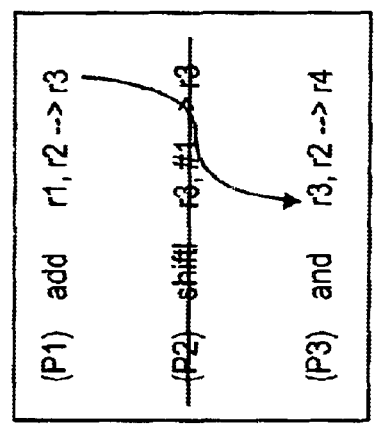
Figure 5A:
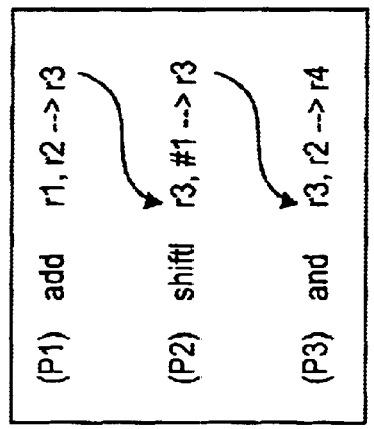

FIGS. 5A–5C represent different bypass configurations that may result as different instructions are nullified by their associated predicates. In FIG. 5A, all (predicted) predicates are true. A bypass couples the value written by an ADD instruction in clock cycle n to the dependent SHIFTL (left shift) instruction in clock cycle n+1. Another bypass couples the value written by the SHIFTL in clock cycle n+1 to the AND instruction in clock cycle n+2.

In FIG. 5B, stage predicate P2 is predicted to be false, as indicated by the strike-through. A bypass couples the value written by the ADD in clock cycle n to the AND in clock cycle n+2. In FIG. 5C, the ADD and SHL are both nullified by their (predicted) predicates, as indicated by the strike-throughs. The value in logical register r3 is provided to the AND from a corresponding physical register in the register file.

The present invention provides predicted predicates early in the execution pipeline, allowing bypass routing and hazard handling decisions to be made speculatively, as they arise. In particular, PPU 440 determines (1) whether a predicate is written by an instruction and (2) a predicted value of the stage predicate, if it is written.

For the counted loop embodiment of FIG. 1A, SP and RRB depend on the current values of LC and EC. For the while loop embodiment of FIG. 1B, RRB depends on the current values of EC and the branch predicate (TK/NT status). For non-modulo-scheduled branch types, SP and RRB are not considered. These dependencies are summarized in Table 1.

TABLE 1

| BRANCH-TYPE | SP_VLD | SP_DATA | ROT_EN |
|---|---|---|---|
| CTOP | 1 | (LC > 0) | (LC > 0 \|\| EC > 0) |
| CEXIT | 1 | (LC > 0) | (LC > 0 \|\| EC > 0) |
| WTOP | 1 | 0 | (!BR_PR \|\| EC > 0) |

TABLE 1-continued

| BRANCH-TYPE | SP_VLD | SP_DATA | ROT_EN |
|---|---|---|---|
| WEXIT | 1 | 0 | (!BR_PR ‖ EC > 0) |
| ALL OTHERS | 0 | NA | 0 |

For the disclosed embodiment of pipeline 300, LC, EC are determined in DET or WRB, and are not available for determining speculative values of SP or RRB. As noted above, the disclosed embodiment of PPU 420 employs branch prediction and branch type information available in REN to determine, speculatively, whether SP is written (SSP_VLD), and if so, the value of SP to be written (SSP_DATA). PPU 420 may also adjust RRB (SROT_EN) speculatively, using this information.

One embodiment of PPU 420 predicts the values EC and LC will have in DET when the branch instruction currently in REN reaches DET. These speculative loop status values are used with branch type and branch predict information to provide speculative values for SP and RRB.

Figure 6:
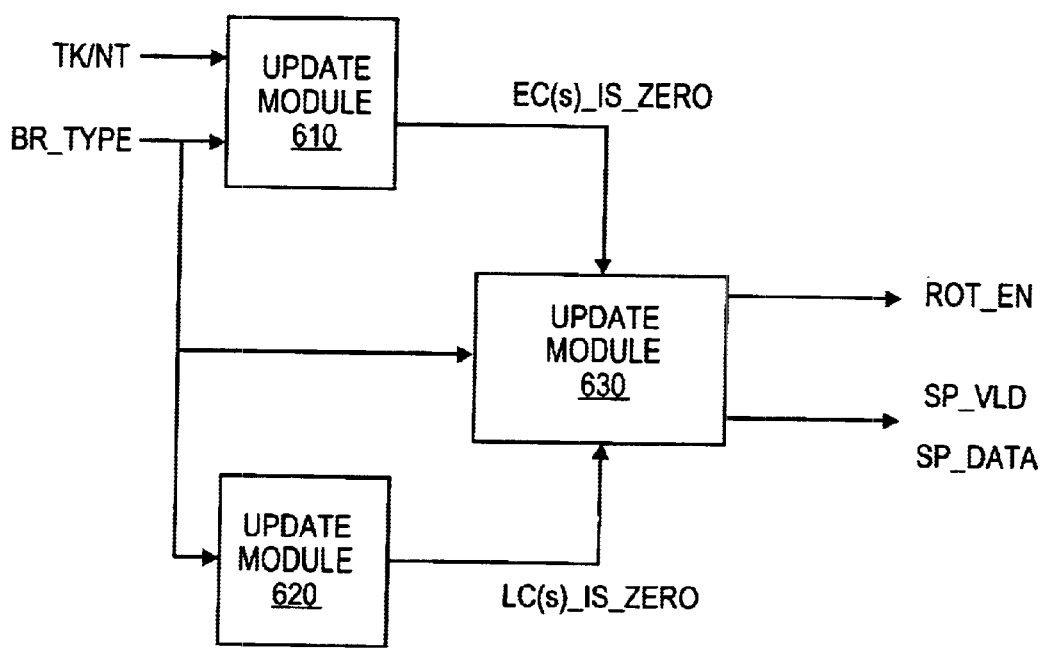
FIG. 6 is a more detailed block diagram of one embodiment of the predicate prediction unit shown in FIG. 4.

FIG. 6 is a block diagram of one embodiment of PPU 420 in accordance with the present invention. The disclosed embodiment of PPU 420 includes update modules 610, 620, and 630. Update modules 610 and 620 provide speculative values of EC and LC (EC(s) and LC(s), respectively). Update module 630 indicates whether and how speculative values of the stage predicate (SSP) and RRB are updated, according to the status of EC(s), LC(s), and the type of the branch instruction currently in REN.

For one embodiment of PPU 440, EC(s)_IS_Zero is a speculative state variable that has a value of 1 or 0 according to whether or not EC(s) is predicted to be zero when the branch instruction currently in REN reaches DET. Similarly, LC(s)_IS_ZERO is a speculative state variable that has a value of 1 or 0 according to whether or not LC(s) is predicated to be zero when the current branch instruction reaches DET.

Table 2 represents a state machine implemented by update module 610 to adjust the current value of EC(s)_IS_ZERO to a next value of EC(s)_IS_ZERO, according to the type of branch-related instruction entering REN. For CTOP, WTOP, CEXIT, and WEXIT type loop branches, this determination uses branch predict information (TK, NT) from, e.g., BPU 410.

Table 2 also includes a column for the case in which the branch prediction is invalidated when it is checked, e.g., in the DET stage. In this case, the state of EC(s)_IS_ZERO is determined by reference to the current architectural value of EC, i.e. EC(a). Table 2 also reflects a priority for the different assignments of EC(s)_IS_ZERO, since multiple assignments may be indicated if multiple branches are executed concurrently. For example, assignments in the column labeled INVALID have the highest priority. The priority of assignments in the next three columns is determined by which column is associated with the first taken branch. The assignments represented by the last column (MOV_TO_LC) has the lowest priority. Finally, if none of the above assignments are applicable, the next value of EC(s)_IS_ZERO equals the current value of EC(s)_IS_ZERO.

TABLE 2

| | Next EC(s)_IS_ZERO | | | | |
|---|---|---|---|---|---|
| Current EC(s)_IS_ZERO | IN-VALID | TK/RET | CTOP/WTOP | CEXIT/WEXIT | MOV_TO_EC |
| 1 | EC(a) | 0 | 1 | 1 | 0 |
| 0 | EC(a) | 0 | 1 if NT<br>0 if TK | 0 if NT<br>1 if TK | 0 |

Update module 620 may maintain the status of LC(s)_IS_ZERO by adjusting an initial value of LC according to the number of LC-decrementing instructions in-flight and comparing the result to zero. For the disclosed embodiment, LC-decrementing instructions include CTOP and CEXIT loop branch instructions. The initial value of LC may be set, for example, by a MOV_TO_LC instruction. The logic function implemented by one embodiment of update module 620 is:

```
IF (BR INVALID) then LC(s) = LC(a)
ELSE
IF [(CTOP ‖ CEXIT) && NOT LC(s)_IS_ZERO] LC(s) --
LC(s)_IS_ZERO := (LC(s).GT.0)
```

Update module 630 uses LC(s)_IS_ZERO and EC(s)_IS_ZERO to generate SROT_EN, SSP_VLD, and SSP_DATA. These may be used to adjust the speculative state of the processor until the corresponding branch instruction is fully executed. The logic functions implemented by update module 630 to generate SROT_EN, SSP_VLD and SSP_DATA are as follows:

```
SSP_VLD  := CTOP ‖ CEXIT ‖ WTOP ‖ WEXIT
SSP_DATA := (CTOP ‖ CEXIT) && NOT (LC(s)_IS_ZERO)
SROT_EN  := (CTOP ‖ CEXIT ‖ WTOP ‖ WEXIT) &&
            NOT (EC(s)_IS_ZERO
```

For the exemplary ISA, WTOP and WEXIT branches write a zero to the stage predicate on each iteration. Other modulo-scheduled while type loop branches may operate in a manner that is more similar to the described for CTOP and CEXIT instructions in the exemplary ISA.

Figure 7:
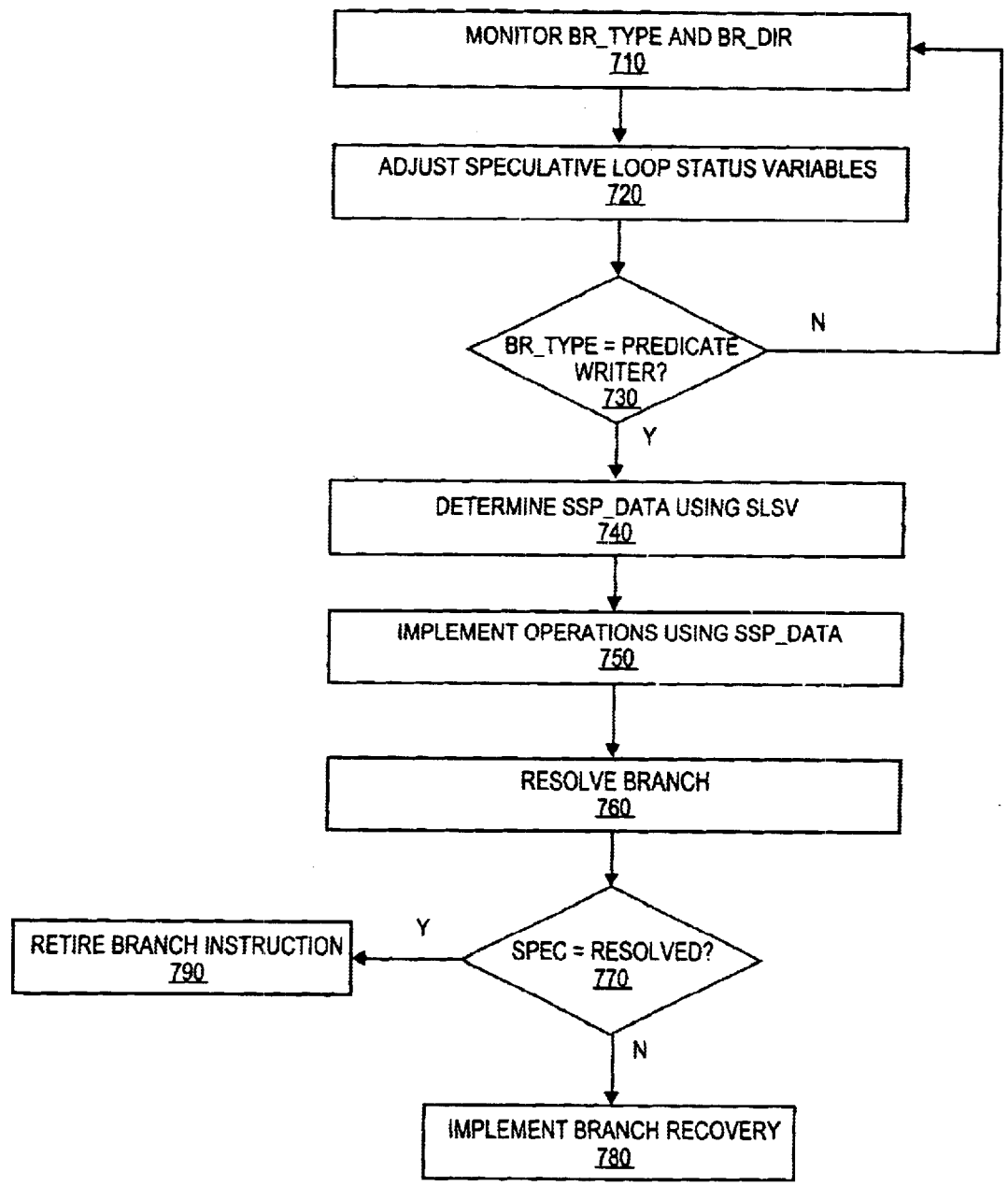
FIG. 7 is flowchart representing a method in accordance with the present invention for processing predicted predicates.

FIG. 7 is a flowchart representing a method 700 in accordance with the present invention for predicting predicates. BR_TYPE and BR_DIR information is monitored 710 and speculative loop status variables are adjusted 720 accordingly. If the BR_TYPE information indicates 730 that the current instruction is not a predicate-writing instruction, method 700 continues monitoring 710 and adjusting 720 the speculative loop status variables.

If the BR_TYPE information indicates 730 that the current instruction is a predicate-writing instruction, a predicate value is predicted 740, using the speculative loop status variables. Operations affected by the predicate are implemented 750, using the predicted predicate value. When the branch is resolved 760, the predicted predicate value is compared 770 with the value provided by the resolved branch. If the comparison indicates a match, the branch instruction is retired 790. If the comparison indicates no match, a branch recovery mechanism is implemented 780.

Figure 8:
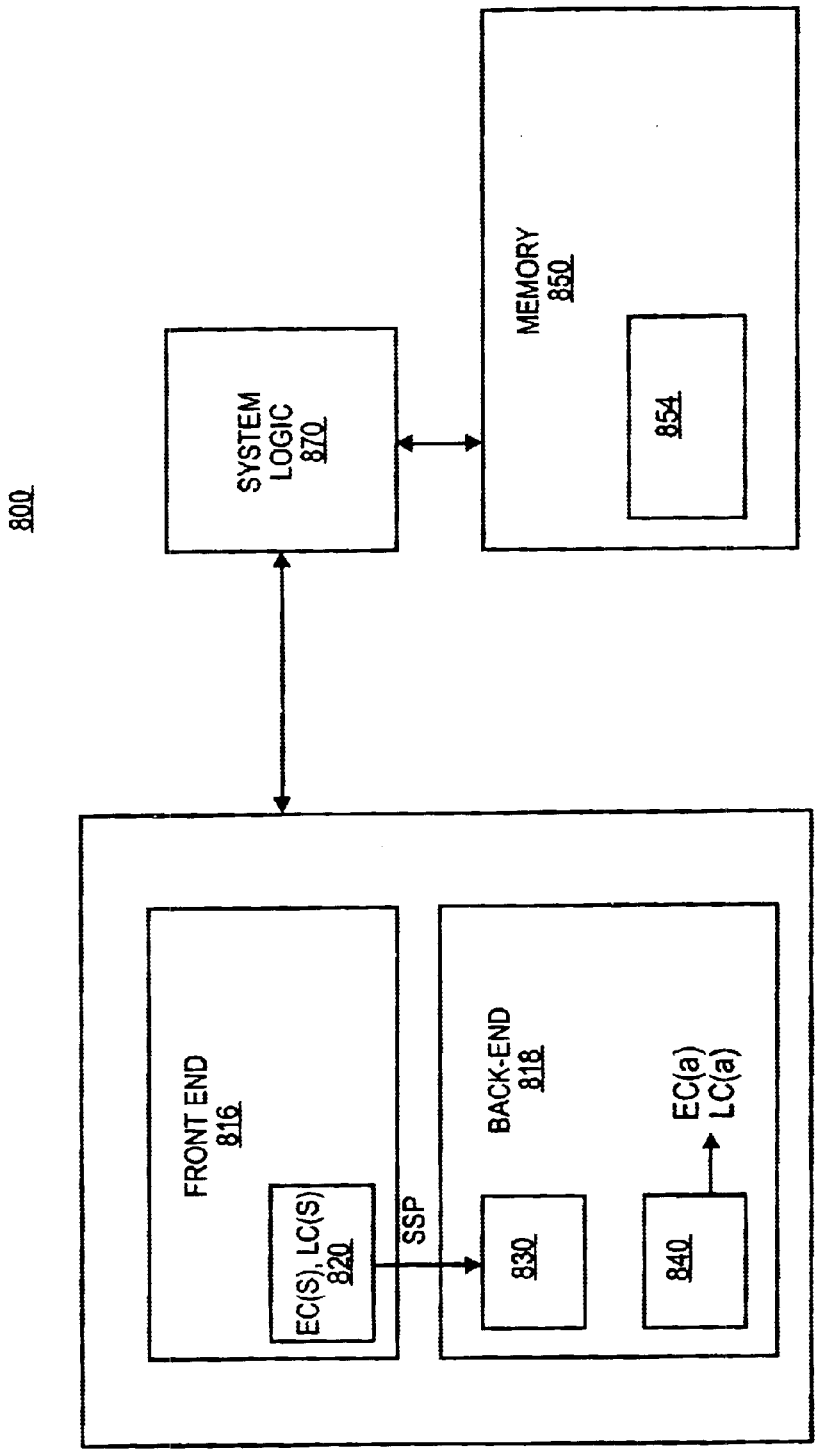
FIG. 8 is a block diagram of one embodiment of a computer system that includes a predicate predictor in accordance with the present invention.

FIG. 8 is a block diagram of one embodiment of a computer system 800 in which the present invention is implemented. Computer system 800 includes a processor 810, a memory 850 and system logic 870 through which processor 810 and memory 850 communicate. Processor 810 includes an instruction execution pipeline 814 having a front end portion 816 and a back end portion 818. Front end portion 816 retrieves instructions from memory 820 for execution by back end portion 818. For the exemplary embodiment of computer system 800, memory 820 stores a program segment 824 that includes a modulo-scheduled loop. Back end portion 818 includes logic to execute, validate and retire instructions received from front end portion 816. Results from validated instructions are used to update processor state information, including architectural loop status variables. Back end portion 818 also includes resources such as hazard and bypass logic to handle data for instructions being executed.

A predicate predictor 820 is associated with front end portion 816. Predicate predictor 820 monitors selected instruction information in front end portion 816 to maintain speculative copies of loop status variables (EC(s), LC(s)). Predicate predictor 820 uses these speculative loop status variables to provide predicate prediction information (SSP) to back end portion 818, as needed. In particular, hazard and bypass logic (830) use predicted predicate values to modify intermediate operations, as needed. These operations are checked by validation logic 840 in back end portion 818, before the associated instructions are retired.

A mechanism has thus been described for handling predicate prediction by predicting whether a predicate will be written and a value for a predicate that is predicted to be written. For one embodiment of the invention, a predicate predictor monitors branch type and branch prediction information, and updates speculative loop status variables accordingly. The predicate predictor uses the monitored branch type to determine whether a predicate will be written. The predicate predictor uses the branch type and speculative loop status variables to predict a value for the predicate when it is predicted to be written. The predicated predicate value may be used to implement operations speculatively. When the controlling branch instruction is resolved, the speculative and resolved values are compared. If they match, the branch instruction is retired. If they do not match, a branch recovery mechanism is implemented.

The present invention has been illustrated for the case in which the predicate is a stage predicate for a modulo-scheduled loop, and the loop status variables include an epilog counter and/or a loop counter. Persons skilled in the art of processor design will recognize modifications and variations of the disclosed mechanism that none the less fall within the spirit of the present invention. The disclosed embodiments are provided to illustrative rather than limit the present invention, the scope of which is limited only by the appended claims.

What is claimed is:

1. A processor comprising:
   a front-end module to provide branch type and branch prediction information; and
   a predicate predictor coupled to said front-end module and to a back-end module to predict before execution of a first instruction whether a predicate is written during execution of said first instruction when the branch type information indicates a selected branch type, and to predict a value to be written for the predicate, using the branch type and branch prediction information, wherein said predicate is to be associated with a second instruction to permit conditional execution of said second instruction.

2. The processor of claim 1, wherein the predicate predictor monitors speculative loop status variables and updates the monitored speculative loop status variables using the branch type and branch predict information.

3. The processor of claim 2, wherein the predicate predictor uses the speculative loop status variables and the branch type information to predict a predicate value.

4. The processor of claim 1, wherein the branch type information is speculative and the predicate predictor uses the speculative branch type information to predict whether the predicate is written.

5. The processor of claim 1, further comprising a branch execution unit to resolve the branch instruction and to validate the predicted predicate information, using resolved branch information.

6. The processor of claim 2, further comprising a hazard unit to identify data hazards, the hazard unit signaling an identified data hazard or not according to the predicted predicate value.

7. The processor of claim 6, further comprising a bypass unit to route data between execution units, the bypass unit to configure a data route according to the predicted predicate value.

8. The processor of claim 1, wherein the predicate predictor writes a predicted predicate value to a stage predicate for a modulo-scheduled loop iteration when the branch type indicates a modulo-scheduled loop branch.

9. The processor of claim 8, wherein the predicate predictor maintains speculative loop status variables using the branch predict and branch type information.

10. The processor of claim 9, wherein the predicate predictor uses the speculative loop status variables to determine the value written to the stage predicate.

11. The processor of claim 10, wherein the speculative loop status variables include speculative values of a loop counter and an epilog counter.

12. The processor of claim 10, wherein the predicate predictor further comprises:
   a first update module to maintain a speculative loop counter state;
   a second update module to maintain a speculative epilog counter state; and
   a third update module to generate a predicate valid signal and a predicate data signal using the one of more of the branch predict information, the branch type information, the speculative epilog counter state, and the speculative loop counter state.

13. The processor of claim 1, further comprising a branch execution unit to resolve a branch corresponding to the branch prediction information and to resteer the processor if the resolved branch disagrees with the branch predict information.

14. A method for predicting predicates comprising:
   monitoring a branch type and a branch prediction;
   adjusting a speculative loop status variable according to the monitored branch type and branch prediction:
   predicting before execution of a first instruction whether execution of said first instruction will write a predicted predicate value when the branch type information indicates a selected branch type, wherein said predicted predicate value is to be associated with a second instruction to permit conditional execution of said second instruction; and
   predicting the predicted predicate value using the speculative loop status variable.

15. The method of claim 14 wherein adjusting a speculative loop status variable comprises:

adjusting a speculative loop counter state according to the monitored branch type; and adjusting a speculative epilog counter state according to the monitored branch type and branch prediction.

16. The method of claim 14, wherein adjusting a speculative loop counter state comprises:

decrementing a speculative loop counter when the branch type is a counted branch type; and setting the speculative loop counter state to a first logic value if the decremented speculative loop counter reaches a threshold value.

17. The method of claim 14, wherein adjusting a speculative epilog counter state comprises:

maintaining the speculative epilog counter state in a first logic state if the branch type is a counted or while branch type;

maintaining the speculative epilog counter state in a second logic state if the branch type is CTOP or WTOP and the branch prediction is taken; and switching the speculative epilog counter state from the second logic state to the first logic state if the branch type is CTOP or WTOP and the branch prediction is not taken.

18. The method of claim 17, further comprising:

maintaining the speculative epilog counter state in a second logic state if the branch type is CEXIT or WEXIT and the branch prediction is not taken; and switching the speculative epilog counter state from the second logic state to the first logic state if the branch type is CEXIT or WEXIT and the branch prediction is taken.

19. The method of claim 14, wherein the branch type information a speculative branch type and writing the predicted predicate value comprises writing a predicted stage predicate value if the speculative branch type is a modulo-scheduled loop branch.

20. The method of claim 19, further comprising:

resolving a branch that writes the predicted predicate value to determine a resolved predicate value;

comparing the predicated and resolved predicate values; and providing a resteer address if the predicted and resolved predicates do not match.

21. A computer system comprising:

a memory to store instructions for a modulo-scheduled loop; and a processor having an execution pipeline with a front end portion to provide the stored instructions for execution, a back end portion to execute the provided instructions and update loop status variables accordingly, and a predicate predictor coupled to said front end portion and said back end portion to maintain speculative values for the loop status variable, to predict before execution of a first one of said set of instructions whether a predicate is to be written when the branch type information indicates a selected branch type, wherein said predicate is to be associated with a second one of said instructions to permit conditional execution of said second one of said instructions, and to predict predicate values for use in the execution pipeline, using the speculative values of the loop status variables.

22. The computer system of claim 21, wherein the predicate predictor receives branch information from the front end portion of the pipeline and updates the speculative values for the loop status variables using the branch information.

23. The computer system of claim 21, wherein the execution pipeline includes intermediate pipeline stages in which the predicted predicate values gate operations prior to resolution of actual predicate values in the back-end portion of the execution pipeline.

24. The computer system of claim 23, wherein the intermediate pipeline stages include a hazard unit to service or ignore a detected hazard according to the predicted predicate value.

25. The computer system of claim 23, wherein the intermediate pipeline stages include a bypass unit to configure a data bypass according to the predicted predicate value.

* * * * *

UNITED STATES PATENT AND TRADEMARK OFFICE
CERTIFICATE OF CORRECTION

PATENT NO. : 6,629,238 B1
DATED : September 30, 2003
INVENTOR(S) : Arora et al.

It is certified that error appears in the above-identified patent and that said Letters Patent is hereby corrected as shown below:

Column 2,
Line 27, after "logic state", delete "so".

Column 5,
Line 36, after "predicate written", delete "to".

Signed and Sealed this

Twentieth Day of January, 2004

JON W. DUDAS
*Acting Director of the United States Patent and Trademark Office*